(12) United States Patent
Milne

(10) Patent No.: US 9,582,788 B2
(45) Date of Patent: Feb. 28, 2017

(54) DYNAMICALLY SELECTING SENDING AND RECEIVING ACCOUNTS

(71) Applicant: DWOLLA, INC., Des Moines, IA (US)

(72) Inventor: Benjamin P. Milne, San Francisco, CA (US)

(73) Assignee: Dwolla, Inc., Des Moines, IA (US)

(*) Notice: Subject to any disclaimer, the term of this patent is extended or adjusted under 35 U.S.C. 154(b) by 0 days.

(21) Appl. No.: 14/727,648

(22) Filed: Jun. 1, 2015

(65) Prior Publication Data

US 2015/0262147 A1 Sep. 17, 2015

Related U.S. Application Data

(63) Continuation of application No. 12/658,278, filed on Feb. 5, 2010, now abandoned.

(51) Int. Cl.
| G06Q 40/00 | (2012.01) |
| G06Q 20/10 | (2012.01) |
| G06Q 20/40 | (2012.01) |
| G06Q 20/02 | (2012.01) |
| G06Q 20/22 | (2012.01) |
| G06Q 30/06 | (2012.01) |

(52) U.S. Cl.
CPC ............ *G06Q 20/10* (2013.01); *G06Q 20/023* (2013.01); *G06Q 20/227* (2013.01); *G06Q 20/40* (2013.01); *G06Q 20/405* (2013.01); *G06Q 40/00* (2013.01); *G06Q 30/0613* (2013.01)

(58) Field of Classification Search
CPC .... G06Q 20/10; G06Q 30/0613; G06Q 20/40; G06Q 20/405; G06Q 40/00; G06Q 20/023; G06Q 20/227

USPC .................................................... 705/39, 35
See application file for complete search history.

(56) References Cited

U.S. PATENT DOCUMENTS

| 4,321,672 A | 3/1982 | Braun et al. |
| 5,822,737 A | 10/1998 | Ogram |
| 5,825,003 A | 10/1998 | Jennings et al. |

(Continued)

FOREIGN PATENT DOCUMENTS

| WO | WO0161662 A2 | 8/2001 |
| WO | WO2006000021 | 1/2006 |

OTHER PUBLICATIONS

Boyer, M. (2008). Credit unions boost revenue by converting ACH to debit: Interchange revenue critically important to credit unions. ATM & Debit News, 8(12), 1. Retrieved from http://dialog.proquest.com/professional/docview/676059938?accountid=142257 on Nov. 8, 2016.*

(Continued)

*Primary Examiner* — Kito R Robinson
(74) *Attorney, Agent, or Firm* — Hickman Palermo Becker Bingham LLP

(57) ABSTRACT

A computer implemented system for optimizing the transfer of funds from an account holder to an associate is disclosed. The system uses digitally stored logic to identify the geographic location of a first financial institution involved in the transaction. The system dynamically selects from a plurality of financial institutions a second financial institution which is located near the first financial institution to be involved in the transaction. Selecting a second financial institution nearby the first financial institution facilitates the transaction and reduces the time transaction funds are unavailable.

20 Claims, 7 Drawing Sheets

(56) References Cited

U.S. PATENT DOCUMENTS

| | | | |
|---|---|---|---|
| 5,903,878 A | 5/1999 | Talati et al. | |
| 6,311,170 B1* | 10/2001 | Embrey | G06Q 20/02 705/39 |
| 6,796,492 B1* | 9/2004 | Gatto | G06Q 20/10 235/379 |
| 6,999,943 B1* | 2/2006 | Johnson | G06Q 20/10 705/35 |
| 7,031,939 B1 | 4/2006 | Gallagher et al. | |
| 7,089,208 B1 | 8/2006 | Levchin et al. | |
| 7,107,249 B2 | 9/2006 | Dively et al. | |
| 7,113,930 B2 | 9/2006 | Eccles et al. | |
| 7,191,151 B1 | 3/2007 | Nosek | |
| 7,249,094 B2 | 7/2007 | Levchin et al. | |
| 7,324,976 B2 | 1/2008 | Gupta et al. | |
| 7,383,231 B2 | 6/2008 | Gupta et al. | |
| 7,536,336 B1 | 5/2009 | Guinan | |
| 7,587,342 B2 | 9/2009 | Neofytides et al. | |
| 7,617,128 B2* | 11/2009 | Greak | G06Q 30/0609 705/26.35 |
| 7,672,902 B1* | 3/2010 | Bent | G06Q 20/10 705/35 |
| 7,766,244 B1* | 8/2010 | Field | G06Q 20/357 235/487 |
| 7,797,207 B1* | 9/2010 | Dilip | G06Q 20/10 705/35 |
| 7,805,352 B2* | 9/2010 | Mercier | G06Q 40/00 705/35 |
| 7,912,768 B2* | 3/2011 | Abeles | G06Q 20/10 705/31 |
| 8,032,452 B2* | 10/2011 | Michelsen | G06Q 10/00 235/379 |
| 8,050,997 B1 | 11/2011 | Nosek et al. | |
| 8,083,141 B1* | 12/2011 | Courtright | G06Q 20/1085 235/380 |
| 2002/0152176 A1* | 10/2002 | Neofytides | G06Q 20/02 705/64 |
| 2003/0046094 A1* | 3/2003 | Singh | G06Q 20/02 705/39 |
| 2003/0046224 A1* | 3/2003 | Mujtaba | G06Q 20/10 705/39 |
| 2003/0074310 A1* | 4/2003 | Grovit | G06Q 20/00 705/39 |
| 2003/0126075 A1* | 7/2003 | Mascavage, III | G06Q 20/02 705/39 |
| 2003/0163425 A1* | 8/2003 | Cannon, Jr. | G06Q 20/04 705/42 |
| 2003/0163432 A1* | 8/2003 | Cannon, Jr. | G06Q 20/10 705/64 |
| 2003/0167237 A1* | 9/2003 | Degen | G06Q 20/10 705/64 |
| 2005/0049950 A1* | 3/2005 | Johnson | G06Q 20/3433 705/35 |
| 2005/0144128 A1* | 6/2005 | McCoppin | G06Q 20/02 705/40 |
| 2007/0150414 A1* | 6/2007 | Templeton | G06Q 20/102 705/40 |
| 2007/0179885 A1* | 8/2007 | Bird | G06Q 20/04 705/39 |
| 2007/0255652 A1 | 11/2007 | Tumminaro et al. | |
| 2007/0282739 A1* | 12/2007 | Thomsen | G06Q 20/10 705/39 |
| 2008/0040275 A1* | 2/2008 | Paulsen | G06Q 20/40 705/44 |
| 2008/0070593 A1 | 3/2008 | Altman et al. | |
| 2008/0126245 A1* | 5/2008 | Rosenberg | G06Q 20/10 705/39 |
| 2008/0147549 A1* | 6/2008 | Rathbun | G06Q 20/10 705/44 |
| 2008/0189209 A1* | 8/2008 | Loomis | G06Q 20/10 705/44 |
| 2009/0076934 A1* | 3/2009 | Shahbazi | G06Q 20/102 705/30 |
| 2010/0017325 A1 | 1/2010 | Scherpa et al. | |
| 2010/0030687 A1* | 2/2010 | Panthaki | G06Q 20/108 705/43 |
| 2010/0063924 A1* | 3/2010 | Hougland | G06Q 20/10 705/40 |
| 2010/0114764 A1* | 5/2010 | Cataline | B01F 11/0071 705/40 |
| 2010/0169212 A1* | 7/2010 | Paintin | G06Q 20/10 705/40 |
| 2010/0250436 A1* | 9/2010 | Loevenguth | G06Q 20/02 705/44 |
| 2011/0137796 A1* | 6/2011 | Tullis | G06Q 20/02 705/44 |
| 2011/0166989 A1* | 7/2011 | Ross | G06Q 20/10 705/39 |
| 2011/0238568 A1* | 9/2011 | Booth | G06Q 20/10 705/39 |
| 2011/0251906 A1* | 10/2011 | Loevenguth | G06Q 20/10 705/16 |
| 2012/0030098 A1* | 2/2012 | Bulawa | G06Q 20/102 705/40 |
| 2014/0019341 A1* | 1/2014 | Frohwein | G06Q 20/10 705/39 |
| 2014/0089188 A1* | 3/2014 | Rao | G06Q 20/108 705/43 |
| 2014/0164224 A1* | 6/2014 | Grigg | G06Q 40/02 705/39 |
| 2015/0227140 A1* | 8/2015 | Douglas | G05D 1/0217 701/23 |
| 2015/0312710 A1* | 10/2015 | Jia | H04W 4/02 455/457 |

OTHER PUBLICATIONS

The ABC'S of CRM. (2001). EFT Report, 24(21), NA. Retrieved from http://dialog.proquest.com/professional/docview/676860558?accountid=142257 on Nov. 8, 2016.*
U.S. Appl. No. 12/658,278, filed Feb. 5, 2010.
U.S. Appl. No. 12/658,278, filed Feb. 5, 2010, Office Action, Feb. 10, 2014.
U.S. Appl. No. 12/658,278, filed Feb. 5, 2010, Notice of Allowance, Jun. 25, 2014.
U.S. Appl. No. 12/658,278, filed Feb. 5, 2010, Final Office Action, Mar. 2, 2015.
U.S. Appl. No. 12/658,278, filed Feb. 5, 2010, Office Action, Oct. 7, 2014.
U.S. Appl. No. 12/658,278, filed Feb. 5, 2010, Office Action, Sep. 6, 2012.
U.S. Appl. No. 12/658,278, filed Feb. 5, 2010, Final Office Action, Apr. 5, 2013.
Gannes, Liz, "Twitpay Sells for $100K, Will be Used for Charity Fundraising", http://gigaom.com dated Feb. 19, 2010, 3 pages.
Feb. 16, 2010 GigaOm article, Venmo's Simple, Loaded Premise: Pay Your Friends From Your Gannes, Liz, "Venmo's Simple, Loaded Premise: Pay Your Friends From Your Phone", Feb. 16, 2010, 5 pages.
Jason DeParle, New York Times, "News Service", dated Nov. 23, 2007, Sending Money Home Gives Western Union a Major Migrant Role., Deseret News Retrieved, Jun. 19, 2014.
Blum, A., Quick and Easy Money Transfers?, Where there's a wire, there's a way. International Herald Tribune Retrieved Dated Jun. 19, 2014.

* cited by examiner

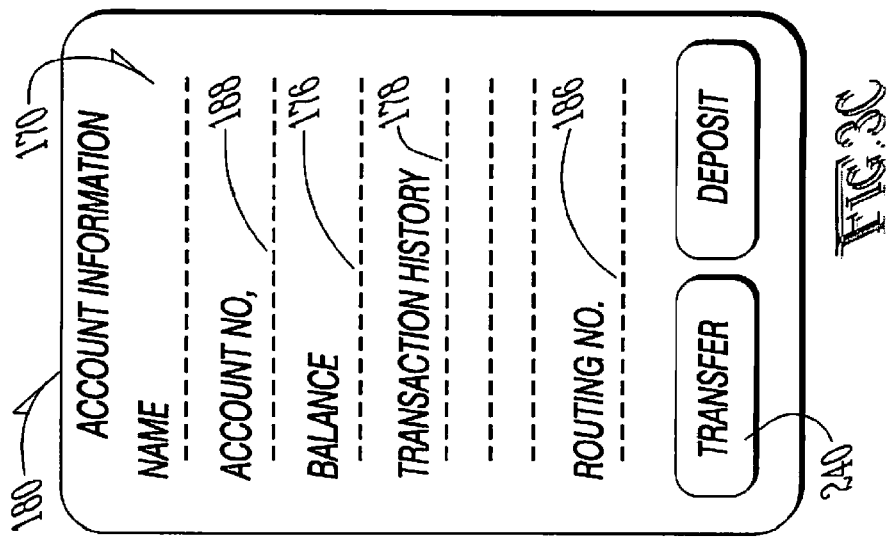
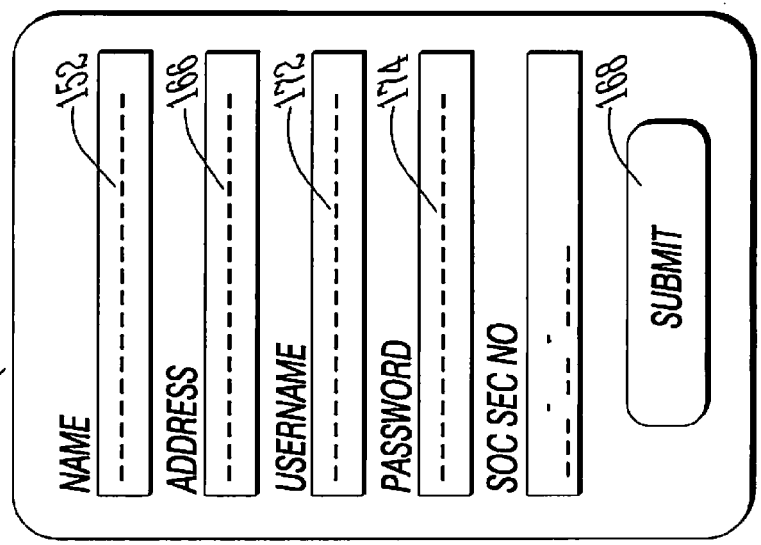
FIG. 3C
FIG. 3B
FIG. 3A

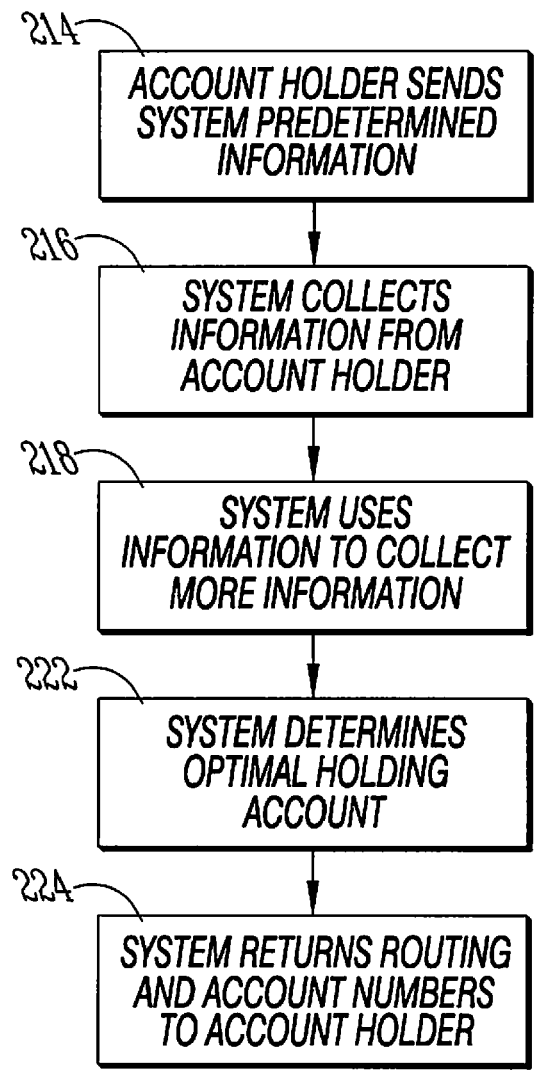

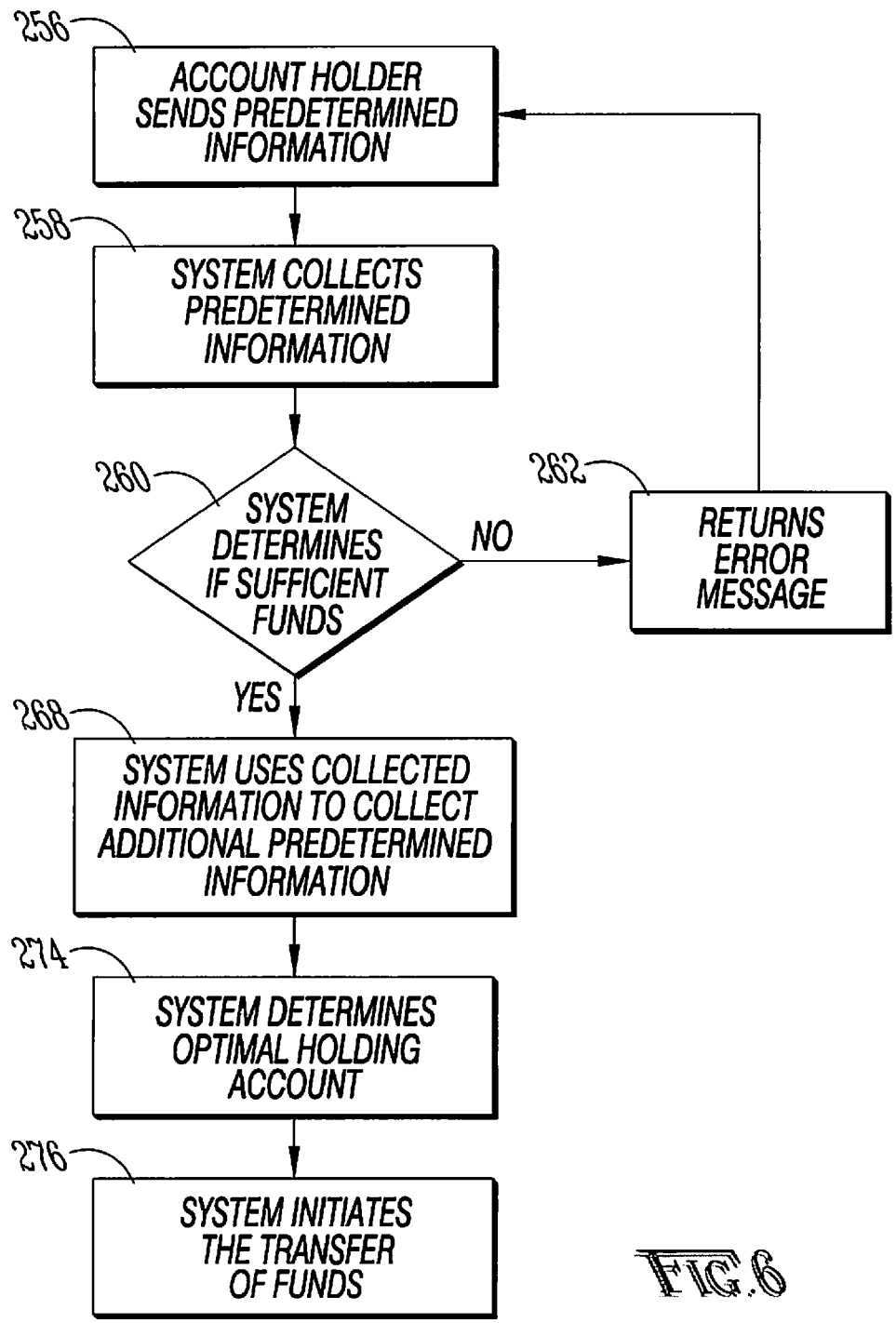

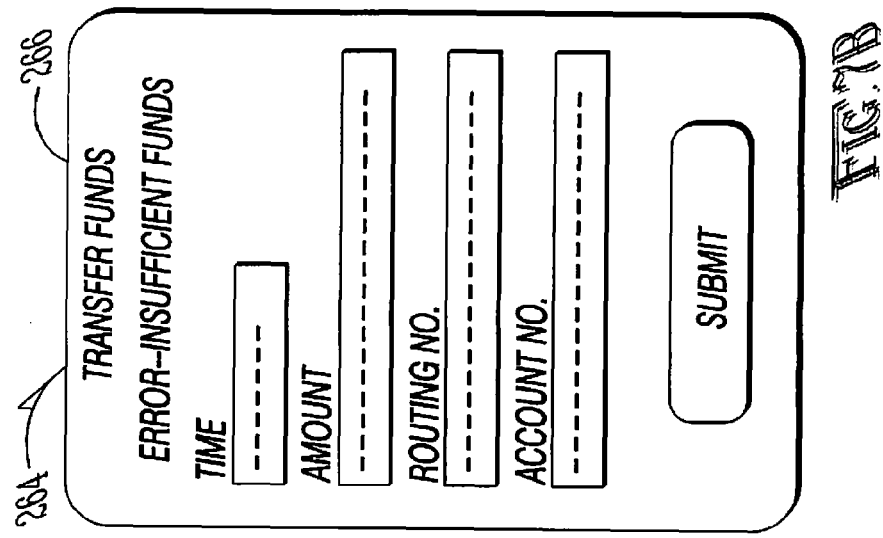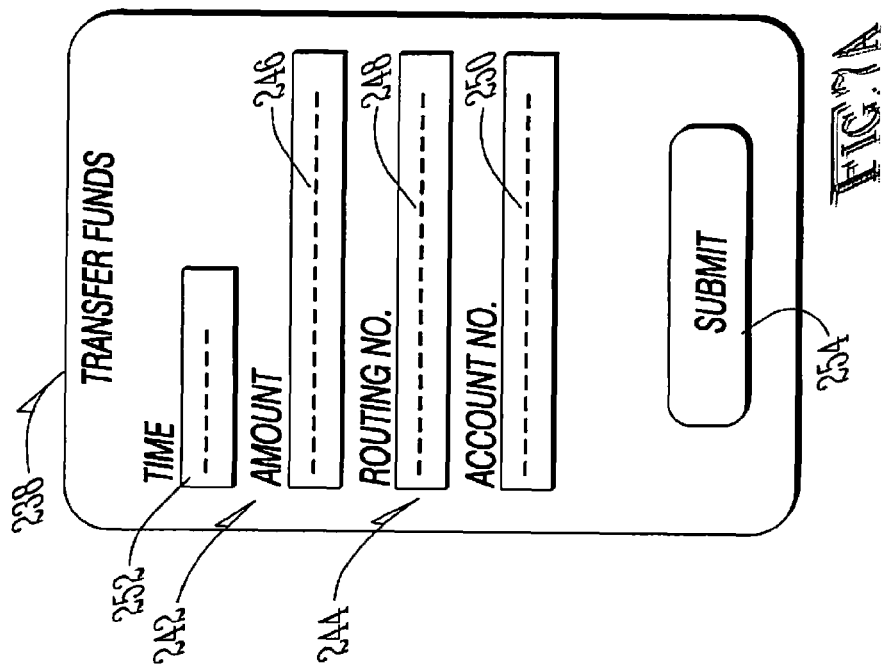

DYNAMICALLY SELECTING SENDING AND RECEIVING ACCOUNTS

CROSS-REFERENCE TO RELATED APPLICATIONS; BENEFIT CLAIM

This application claims the benefit as a Continuation of application Ser. No. 12/658,278, filed Feb. 5, 2010 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure relates to computer implemented logic for increasing the efficiency of a transfer process. Specifically, the present disclosure relates to computer implemented logic for dynamically selecting sending and receiving accounts to optimize the transfer process.

BACKGROUND

Conventional financial transactions only support traditional financial transfers from one financial institution to another. The use of various systems, including clearinghouse systems to facilitate the transfer of funds can cause undesirable delays during which the funds may not be accessible.

SUMMARY

The present invention includes systems and methods for modifying the routing of funds from an account holder to an associate to increase the efficiency of the transaction. An account holder authorizes the transfer of a predetermined amount of account holder funds to an associate. The location of a receiving financial institution associated with the associate is determined and a transfer financial institution is selected from a plurality of financial institutions based upon proximity to the receiving financial institution. Funds are transferred from the transfer financial institution to the receiving financial institution and the account holder's account is debited the amount of the transfer. The transfer financial institution is selected from the plurality of financial institutions to decrease the time associated with the transfer of the funds. The features and advantages described in this summary and the following detailed description are not all-inclusive. Many additional features and advantages will be apparent to one of ordinary skill in the art in view of the drawings, specification and claims presented herein.

BRIEF DESCRIPTION OF THE DRAWINGS

The present invention will now be described, by way of example, with reference to the accompanying drawings in which:

FIG. 3A depicts an example of a home page of a website used in accordance with one embodiment;

FIG. 3B depicts an example of a registration webpage used in accordance with one embodiment;

FIG. 3C depicts an example of an account information webpage used in accordance with one embodiment;

FIG. 5 is a flowchart illustrating depositing funds into the system used in accordance with one embodiment;

FIG. 6 is a flowchart illustrating receiving funds into the system used in accordance with one embodiment;

FIG. 7A depicts an example of a transfer funds page of a website used in accordance with one embodiment; and FIG. 7B depicts an example of a transfer funds error page of a website used in accordance with one embodiment.

DETAILED DESCRIPTION

Figure 1:
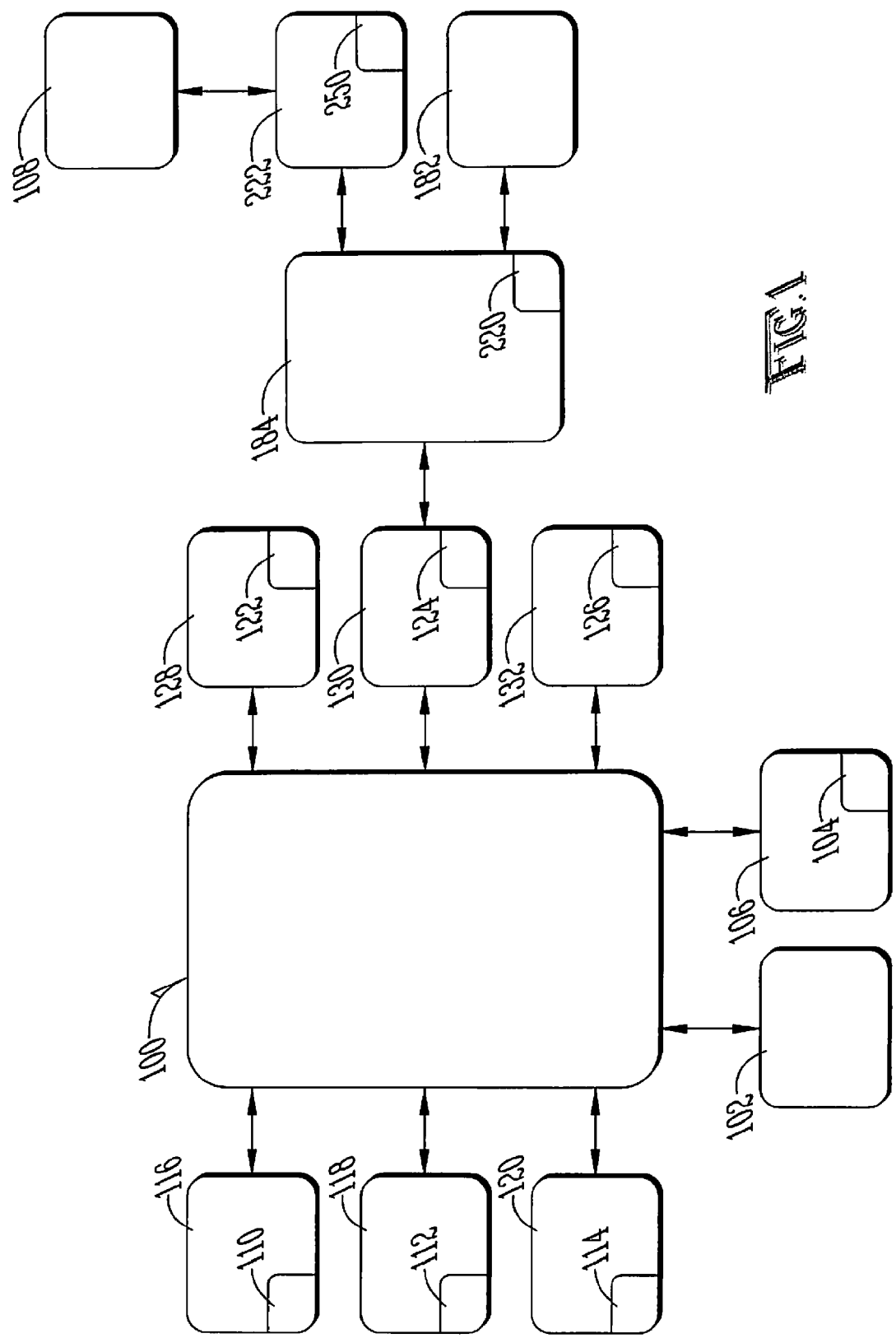
FIG. 1 is a block diagram of the financial institution architecture in accordance with one embodiment.

As shown in FIG. 1, a transaction processing system (100) is provided to allow a manager (102) to optimize the transfer of funds (104) from an account holder (106) to an associate (108). The system (100) collects funds (110), (112) and (114) from users (116), (118) and (120), and deposits the funds (110), (112) and (114) in a plurality of holding accounts (122), (124) and (126) located in a plurality of financial institutions (128), (130) and (132). When a user such as the account holder (106) wishes to originate a fund transfer, the system (100) dynamically determines an optimized transfer financial institution (128) or institutions (128) and (132) to make the transfer. By collecting information about the transfer and selecting an optimized transfer financial institution (128) based upon the information, the system (100) advantageously avoids the delays and other drawbacks of traditional financial transaction systems.

Figure 2:
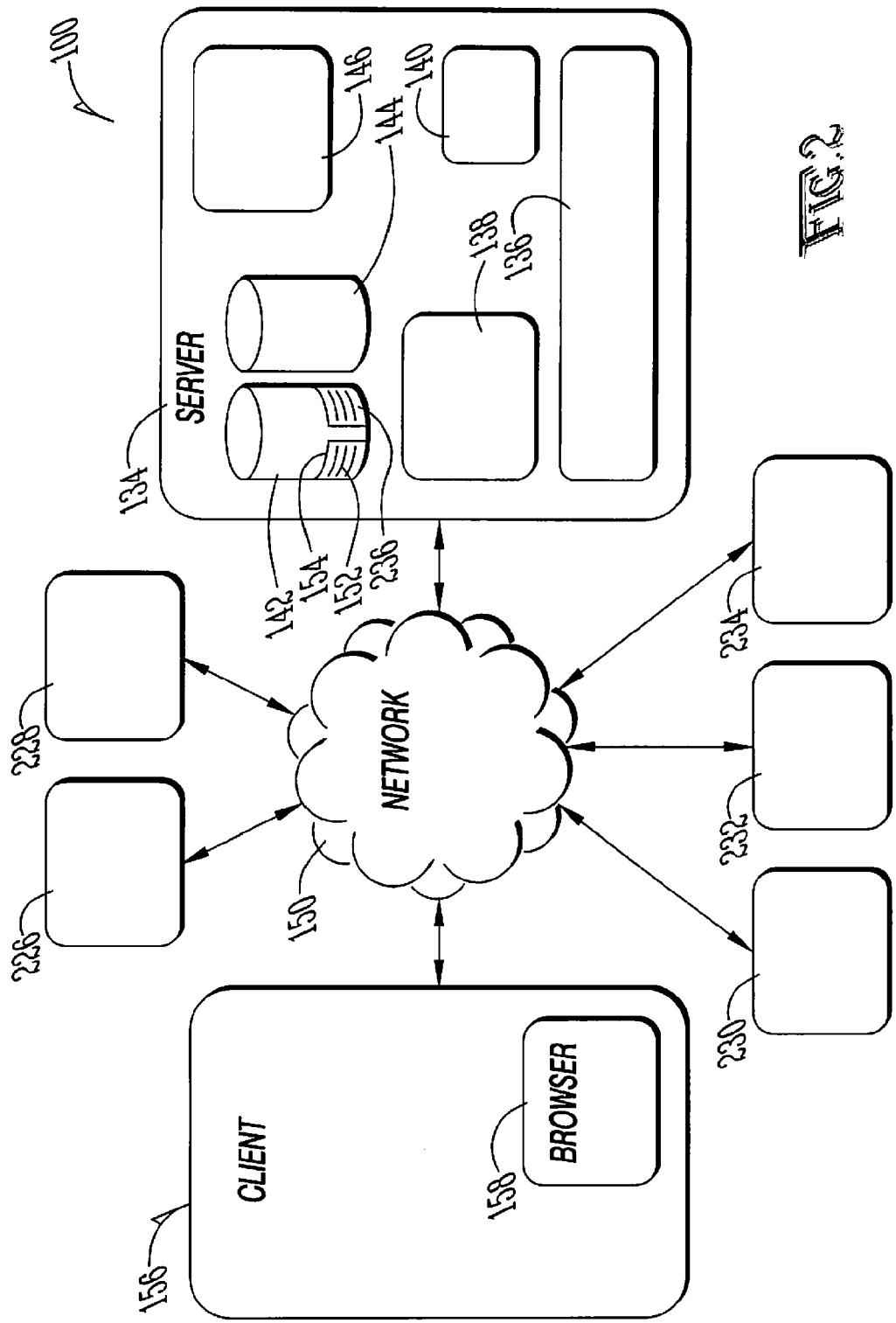
FIG. 2 is a block diagram of the system architecture in accordance with one embodiment.

FIG. 2 is a block diagram of the architecture of the system (100) in accordance with one embodiment. As illustrated in FIG. 1, a server (134) associated with the manager (102) is provided with a front end server (136), a network interface (138), a central processing unit (140), a user database (142) a financial institution database (144) and system software (146). Conventional features, such as firewalls, load balancers, application servers, failover servers, site management tools, as well as additional conventional and known features, are not shown to allow a clearer illustration of the novel features of the system. The manager (102) may be a financial institution, or any desired type of individual or entity.

When the account holder (106) wishes to use the system (100), the account holder (106) accesses the manager's website (148) via a network (150) and provides identifying information (152) to create a user account (154) (FIGS. 1, 2, 3A). As used herein, the term "website" means any system providing content and is not limited to those systems supporting content provided via the Internet or the http protocol. In general, functions described herein as being performed on the server side may also be performed on the client side as appropriate.

Alternatively, the account holder (106) may provide the information (152) telephonically, via electronic mail, via facsimile or by any suitable method of communication (FIGS. 1 and 3A). The account holder (106) uses a client (156) to execute a browser (158) that connects to the server (136) via the network (150). The network (150) is typically the Internet, but may also be any network, including, but not limited to, a LAN, a MAN, a WAN, a mobile, wired or wireless network, a private network or a virtual private network. Although only a single client (156) and browser (158) are shown, it is to be understood that millions of clients may be supported and can be in communication with the server (134) at any given time. If desired, multiple servers may be used. The client (156) may include a variety of different computing devices. Examples of client devices are personal computers, digital assistants, personal digital assistants, mobile phones, smart phones, tablet devices or laptop computers. As will be obvious to one of ordinary skill in the art, the present invention is not limited to the foregoing devices.

The website (148) presents the account holder (106) with an interface (160) which prompts the account holder (106) to click a button (162) which causes the server (134) to display a request page (164) via a secure socket layer (SSL) or similar security protocol (FIGS. 1, 3A, 3B and 3C). The account holder (106) enters the user information (152) in the boxes (166) provided and clicks the submit button (168). The system (100) creates a user account (170) associated with a username (172) and a password (174). The user account (170) includes an account balance (176) and account history (178) that may be displayed on an account webpage (180) in a manner such as that known in the art. The account holder (106) transfers funds into the user account (170) by any known means including, but not limited to, check, credit card, debit card, other ACH processing or a physically delivered cash deposit. The account holder (106) may also transfer funds into the account (170) via another user (116) of the system (100).

The account holder (106) has multiple options to deposit funds into the account (170). The account holder (106) or a third-party may provide an associate financial institution (182) with routing and account numbers associated with the account (170). The associate financial institution (182) may be any type of financial institution. The associate financial institution (182) may transmit the funds and information regarding the transfer to an automated clearinghouse (184) that transmits the funds to a holding account (122) associated with the routing and account numbers. The system (100) then credits the account (170) with the funds.

Figure 4B:
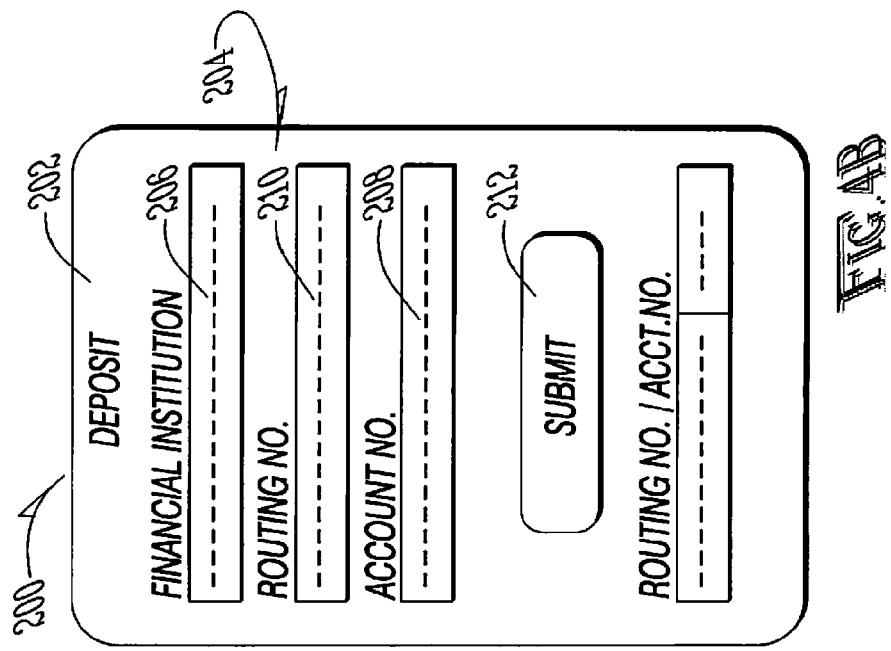
FIG. 4B depicts an example of a deposit webpage used in accordance with one embodiment.
Figure 4A:
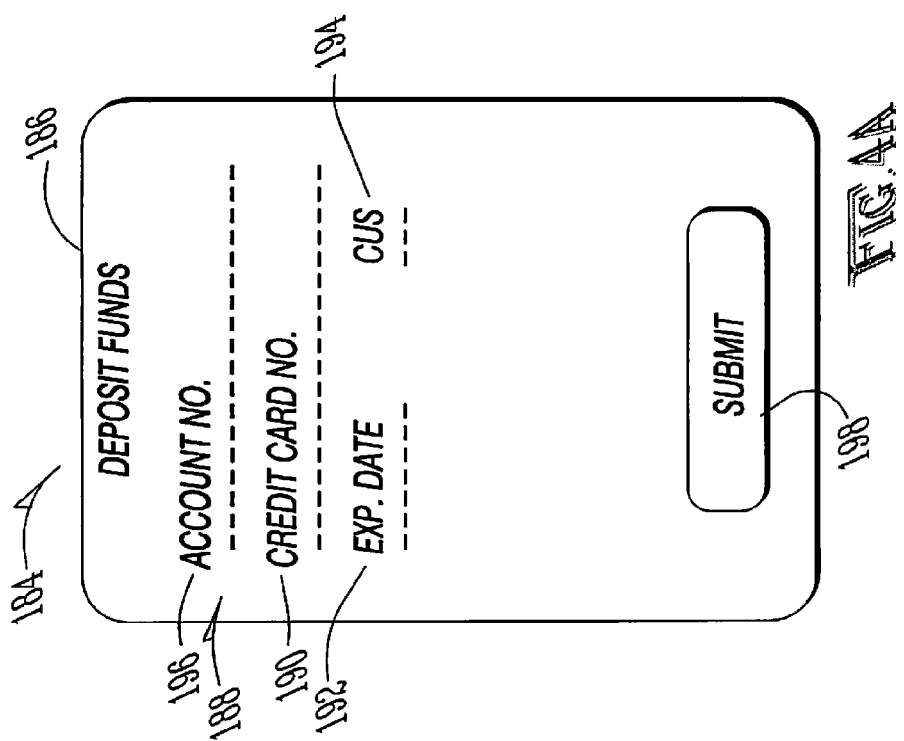
FIG. 4A depicts an example of a credit card deposit webpage used in accordance with one embodiment.

Alternatively, the account holder (106) may add funds directly to the account (170) by using the client (156) to access a deposit funds webpage (186) residing on the server (134) (FIGS. 1, 2 and 4A). From the deposit funds webpage (184), the account holder (106) enters credit or debit card information (188), such as the credit card number (190), expiration date (192) and CVS number (194), along with an account number (196) identifying which of account holder's accounts (170) is to receive the funds. The account holder (106) clicks the submit button (198) and the funds are transferred to the system (100).

Alternatively, the system (100) may be configured to allow the account holder (106) to deposit the funds directly from an account associated with a third party financial institution, the account holder (106) obtains from the system (100) dynamically generated routing and account numbers (200) for the deposit to reduce the transfer time associated with each transaction (FIGS. 1, 2 and 4B). The account holder (106) uses the client (156) to access a deposit funds webpage (202) residing on the server (134). Prior to the deposit, the account holder enters predetermined information (204) associated with the deposit on the deposit funds webpage (202). This information may include the name (206) of the depositing financial institution, the account number (208) of the account (170) the account holder wishes to receive the funds, the routing number (210) and any other information required by the manager (102). The account holder (106) clicks the submit button (212) and the deposit funds webpage (202) displays the dynamically generated routing and account numbers (200).

The account holder (106) provides the dynamically generated routing and account numbers (200) to the third-party financial institution (182) along with transfer instructions, whereafter the third-party financial institution (182) transmits the funds and information regarding the transfer to an automated clearinghouse (184) that transmits the funds to a financial institution (130) and holding account (124) associated with the routing and account numbers (200). The system (100) then credits the account (170) with the funds.

If the ACH system (184) is used, the associate financial institution (182) is the ODFI. The account holder (106) forwards authorization for the transaction to the ODFI via accounts receivable entry (ARC), point of purchase (POP), prearranged payments and deposits (PPD), telephone initiated-entry (TEL) or web-initiated entry (WEB) authorization. The ODFI then forwards the authorized request to an ACH operator, which passes it on the receiving depository financial institution (RDFI). In this case, the RDFI is the financial institution (130) associated with the holding account (124), which credits the account holder's account (170) with the funds.

The system (100) dynamically generates the routing and account numbers (200) to optimize the fund transfer process. When the account holder (106) sends (214) the system (100) the predetermined information (204) by pressing the submit button (212), the system (100) collects (216) the predetermined information (204) and uses it to collect (218) additional predetermined information (220) (FIGS. 1, 2, 4B and 5). As an example, the system (100) may use the routing and account numbers (210) to obtain the geographic location and routing subnet of the third-party financial institution (182) from the financial institution database (144) located on the server (134). The system (100) may collect additional information from cached or "real-time" third-party providers, such as the ACH (184) system.

Using the predetermined information (204) and (220), the system (100) determines (222) the optimal holding account (122), (124) or (126) to receive the funds. This determination may be based upon which of the holding accounts (122), (124) or (126) are insured, which are under the Federal Deposit Insurance Corporation (FDIC) and/or National Credit Union Administrations (NCUA) insurance limit and by what amounts, as well as which of the holding accounts (122), (124) or (126) offer the greatest return on investment. Once the system (100) dynamically determines (222) the optimal holding account (122), (124) or (126) to receive the funds, the system (100) returns (224) the routing and account numbers (200) associated with that holding account (124) to the account holder (106) by displaying the routing and account numbers (200) on the webpage (202). In determining the optimal holding account, the system (100) may weight all factors equally. Alternatively, the system (100) may employ algorithms contained within the system software (146) to determine the optimal holding account to receive the deposited funds. Preferably the optimal holding account (124) as determined by the system (100) is located closest to the third-party financial institution (182) to reduce the transfer time associated with the deposit and thereby reduce the time during which the funds are not available.

The system (100) may also split the funds into a plurality of holding accounts (122), (124) or (126). Alternatively, the system (100) may receive the funds in a single holding account (124), before moving some or all of the funds to additional accounts (122) and (126) as desired. The system (100) may also use "real-time" information relating to the holding accounts (122), (124) or (126), other transactions and the proposed routing to dynamically select the optimal holding account (124).

The foregoing process is used to create multiple user accounts and receive funds from multiple sources. The system (100) uses these funds to seed multiple holding accounts (122), (124) or (126) across multiple financial institutions (128), (130) and (132). The system (100) may also use algorithms within the software (146) to analyze the flow of funds through the system (100), using past data to anticipate future needs and deposit new funds accordingly.

The system (100) may also transfer funds between holding accounts (122), (124) or (126) to optimize the return on investment and to position the system (100) to handle anticipated future transactions more efficiently. Using information from the system (100), the manager (102) may open new holding accounts in new financial institutions or close existing holding accounts in other financial institutions to take advantage of changing returns on investment, or to locate accounts within or closer to financial institutions with increasing transaction activity.

For transfers between users (116) and (118) having accounts associated with the system (100), the system (100) may simply make a bookkeeping entry, crediting and debiting the user accounts, without having to actually transfer any funds between financial institutions (128), (130) and (132).

When the account holder (106) wishes to transfer funds to an associate (108), the account holder (106) provides the system (100) with transfer instructions. The account holder (106) may provide the manager (102) the transfer instructions via the client (156) or via a third-party device, such as a magnetic strip reader (226), check reader (228), parking meter (230), RFID reader (232) or any other third-party device (234). Although the following describes the account holder (106) providing transfer instructions to the system (100) via the client (156) across the network (150), it will be understood by those of ordinary skill in the art, that the account holder (106) may provide the transfer instructions to the system (100) via any conventional or known financial transaction processing device or process.

When the account holder (106) wishes to transfer funds to an associate (108), such as a merchant, the account holder (106) connects via the client (156) to the server (134) via SSL. The server (134) returns the webpage (148), which the account holder (106) uses to enter security information, such as the username (172) and password (174) to access the account holder's account information (236) stored on the user database (142) located on the server (134). The account holder (106) selects the transfer funds webpage (238) by clicking the transfer button (240) on the account webpage (180).

The account holder (106) enters fund transfer instructions (242) on the transfer funds webpage (238) (FIGS. 1, 2 and 7A). The transfer instructions (242) include predetermined information (244) such as the amount (246) of the fund transfer and the routing and account numbers (248) of the transfer account (250) that is to receive the funds. Additional instructions may include time information (252) indicating when the transfer is to be executed and any additional information the manager (102) requires. After the account holder (106) enters the fund transfer instructions (242) on the transfer funds webpage (238), the account holder (106) clicks the submit button (254), which sends (256) the fund transfer instructions (242) to the server (134) (FIGS. 1, 2, 6 and 7A).

The system (100) collects (258) the predetermined information (244) at the server (134) and determines (260) whether the account holder's account (176) contains sufficient available funds to execute the fund transfer instructions (242). If the account holder's account (176) does not contain sufficient available funds to complete the transaction, the system (100) returns (262) an error message (264) to the account holder (106) in the form of a transfer error webpage (266), where the account holder is prompted to send (256) corrected transfer instructions (242) (FIGS. 1, 2, 6, 7A and 7B).

If the account holder account (176) does contain sufficient available funds to complete the transaction, the system (100) uses the collected predetermined information (244) to collect (268) additional predetermined information (270). As an example, the system (100) may use the routing number (248) to obtain the geographic location and routing subnet of a third-party financial institution (272) associated with the transfer account (250) from the financial institution database (144) located on the server (134). The system (100) may collect additional information from cached or "real-time" third-party providers, such as the ACH (184).

Using the predetermined information (244) and (270), the system (100) determines (274) the optimal holding account (122), (124) or (126) from which to transfer the funds. This determination may be based upon the amount of funds in the holding accounts (122), (124) or (126), which accounts are insured, which are under the FDIC and/or NCUA insurance limit and by what amounts, as well as which of the holding accounts (122), (124) or (126) offer the least return on investment. Once the system (100) dynamically determines (274) the optimal holding account (122), (124) or (126) from which to transfer the funds, the system (100) initiates (276) the transfer of funds to the financial institution (272) and associated transfer account (250).

In determining the optimal holding account from which to transfer the funds, the system (100) may weight all factors equally. Alternatively, the system (100) may employ algorithms contained within the system software (146) to determine the optimal holding account to receive the deposited funds. Preferably the optimal holding account (122) to transfer the funds, as determined by the system (100) is located closest to the financial institution (272) and associated transfer account (250), to reduce the transfer time associated with the transfer and thereby reduce the time during which the funds are not available.

If the ACH system is used, the financial institution (128) associated with the optimal holding account (122) is the ODFI. The account holder (106) may initiate the authorization for the transaction through the system (100) to the ODFI via accounts receivable entry (ARC), point of purchase (POP), prearranged payments and deposits (PPD), telephone initiated-entry (TEL) or web-initiated entry (WEB) authorization. The ODFI then forwards the authorized request to an ACH operator, which passes it on the receiving depository financial institution (RDFI). In this case, the RDFI is the financial institution (272) and associated transfer account (250), which credits the transfer account (170) with the funds.

The system (100) may also split the transfer, transferring funds from two or more holding accounts (122) and (124), to further optimize factors associated with the transfer, such as maintaining individual transfers under the FDIC and/or NCUA insured limit. Alternatively, the system (100) may transfer funds from one or more holding accounts (122) and (124) into another holding account (126) before making the transfer. The system (100) may also use "real-time" information relating to the holding accounts (122), (124) or (126), other transactions and the proposed routing of the transaction, to dynamically select the optimal holding account (124) from which to transfer the funds.

Although the invention has been described with respect to a preferred embodiment thereof, it is to be understood that it is not to be so limited since changes and modifications can be made therein which are within the full, intended scope of this invention as defined by the appended claims.

What is claimed is:

1. A computer-implemented method performed on one or more computing devices, the method comprising:
   receiving, using the one or more computing devices, a fund transfer request from a sender, wherein the fund transfer request requests a fund transfer that transfers a predetermined amount of funds from the sender to a receiver;
   identifying, using the one or more computing devices, a sender financial account associated with the sender;
   wherein the sender financial account is associated with a plurality of holding accounts;
   wherein the plurality of holding accounts are associated with a plurality of financial institutions;
   wherein every holding account of the plurality of holding accounts is capable of performing the fund transfer;
   identifying, using the one or more computing devices, a receiver financial account associated with the receiver, wherein the receiver financial account is associated with a receiver financial institution;
   based on information obtained from the sender, the one or more computing devices collecting, from one or more sources other than the sender, information required by algorithms, contained in a software system executing on the one or more computing devices, to determine an optimal holding account from among the plurality of holding accounts;
   wherein the one or more sources include at least one of:
      a database located on a server accessible to the one or more computing devices; or
      computer systems of one or more third-party providers;
   wherein the information required by the algorithms and collected by the one or more computing devices includes (a) amount of time to complete the fund transfer using each holding account of the plurality of holding accounts, (b) geographic location associated with each holding account of the plurality of holding accounts, or both (a) and (b);
   employing the algorithms, contained in the software system executing on the one or more computing devices, to determine an optimal holding account from among the plurality of holding accounts;
   in response to determining the optimal holding account, automatically selecting, using the one or more computing devices, the optimal holding account to be a target holding account to service the fund transfer request; and
      transferring, using the one or more computing devices, the predetermined amount of currency associated with the fund transfer request, from the target holding account to the receiver financial account.

2. The computer-implemented method for transferring funds from a sender to a receiver of claim 1, wherein the one or more selection factors include geographic location associated with each holding account of the plurality of holding accounts.

3. The computer-implemented method for transferring funds from a sender to a receiver of claim 1, wherein the one or more selection factors include amount of time to complete the fund transfer using each holding account of the plurality of holding accounts.

4. The computer-implemented method for transferring funds from a sender to a receiver of claim 1, wherein the one or more selection factors include a predetermined characteristic associated with the receiver financial institution.

5. The computer-implemented method for transferring funds from a sender to a receiver of claim 1, wherein the target holding account is an originating depository institution.

6. The computer-implemented method for transferring funds from a sender to a receiver of claim 1, further comprising transferring the predetermined amount of currency from the target holding account to the receiver financial account through a financial clearinghouse.

7. The computer-implemented method for transferring funds from a sender to a receiver of claim 6, wherein the financial clearinghouse is an automated clearinghouse.

8. The computer-implemented method for transferring funds from a sender to a receiver of claim 1 further comprising:
   prior to receiving the fund transfer request, receiving a deposit request to deposit a particular amount of funds;
   in response to the deposit request, performing the steps of:
   selecting one or more of the plurality of holding accounts based, at least in part, on geographic location of each of the plurality of holding accounts; and
   transferring the particular amount of funds to the one or more holding accounts that were selected.

9. The computer-implemented method for transferring funds from a sender to a receiver of claim 8 wherein multiple holding accounts are selected, wherein each holding account of the multiple accounts receives a portion of the particular amount of funds.

10. The computer-implemented method for transferring funds from a sender to a receiver of claim 1 wherein:
    the target holding account is one of multiple target holding accounts that are selected based on the one or more selection factors, and
    transferring portions of the predetermined amount from each of the multiple target holding accounts to the receiver financial institution.

11. One or more non-transitory computer-readable media storing instructions which, when executed by one or more computing devices, cause performance of a method for transferring funds from a sender to a receiver, performed on one or more computing devices, the method comprising:
    receiving, using the one or more computing devices, a fund transfer request from the sender requesting a fund transfer that transfers a predetermined amount of funds from the sender to the receiver;
    identifying, using the one or more computing devices, a sender financial account associated with the sender, wherein the sender financial account is associated with a plurality of holding accounts, wherein the plurality of holding accounts are associated with a plurality of financial institutions, wherein every holding account of the plurality of holding accounts is capable of performing the fund transfer;
    identifying, using the one or more computing devices, a receiver financial account associated with the receiver, wherein the receiver financial account is associated with a receiver financial institution;
    based on information obtained from the sender, the one or more computing devices collecting, from one or more sources other than the sender, information required by algorithms, contained in a software system executing on the one or more computing devices, to determine an optimal holding account from among the plurality of holding accounts;

wherein the one or more sources include at least one of:
   a database located on a server accessible to the one or more computing devices; or
   computer systems of one or more third-party providers;

wherein the information required by the algorithms and collected by the one or more computing devices includes (a) amount of time to complete the fund transfer using each holding account of the plurality of holding accounts, (b) geographic location associated with each holding account of the plurality of holding accounts, or both (a) and (b);

employing the algorithms, contained in the software system executing on the one or more computing devices, to determine an optimal holding account from among the plurality of holding accounts;

in response to determining the optimal holding account, automatically selecting, using the one or more computing devices, the optimal holding account to be a target holding account to service the fund transfer request; and transferring, using the one or more computing devices, the predetermined amount of currency associated with the fund transfer request, from the target holding account to the receiver financial account.

12. The one or more non-transitory computer-readable media of claim 11, wherein the one or more selection factors include geographic location associated with each holding account of the plurality of holding accounts.

13. The one or more non-transitory computer-readable media of claim 11, wherein the one or more selection factors include amount of time to complete the fund transfer using each holding account of the plurality of holding accounts.

14. The one or more non-transitory computer-readable media of claim 11, wherein the one or more selection factors include a predetermined characteristic associated with the receiver financial institution.

15. The one or more non-transitory computer-readable media of claim 11, wherein the target holding account is an originating depository institution.

16. The one or more non-transitory computer-readable media of claim 11, wherein the method further comprises transferring the predetermined amount of currency from the target holding account to the receiver financial account through a financial clearinghouse.

17. The one or more non-transitory computer-readable media of claim 16, wherein the financial clearinghouse is an automated clearinghouse.

18. The one or more non-transitory computer-readable media of claim 11 wherein the method further comprises:
   prior to receiving the fund transfer request, receiving a deposit request to deposit a particular amount of funds;
   in response to the deposit request, performing the steps of:
      selecting one or more of the plurality of holding accounts based, at least in part, on geographic location of each of the plurality of holding accounts; and
      transferring the particular amount of funds to the one or more holding accounts that were selected.

19. The one or more non-transitory computer-readable media of claim 18 wherein multiple holding accounts are selected, wherein each holding account of the multiple accounts receives a portion of the particular amount of funds.

20. The one or more non-transitory computer-readable media of claim 11, wherein:
   the target holding account is one of multiple target holding accounts that are selected based on the one or more selection factors, and
   transferring portions of the predetermined amount from each of the multiple target holding accounts to the receiver financial institution.

\* \* \* \* \*